United States Patent [19]
Egley et al.

[11] Patent Number: 5,289,719
[45] Date of Patent: Mar. 1, 1994

[54] ACCELEROMETER WITH TEMPERATURE COMPENSATION AND MATCHED FORCE TRANSDUCERS

[75] Inventors: Bert D. Egley, Tacoma, Wash.; Scott D. Orlosky, San Anselmo, Calif.

[73] Assignee: New SD, Inc., San Francisco, Calif.

[21] Appl. No.: 791,940

[22] Filed: Nov. 13, 1991

[51] Int. Cl.⁵ .............................................. G01P 15/08
[52] U.S. Cl. ................................ 73/497; 73/517 AV; 73/DIG. 1
[58] Field of Search ............. 73/497, 517 AV, 862.59, 73/DIG. 1

[56] References Cited

U.S. PATENT DOCUMENTS

| | | | |
|---|---|---|---|
| 4,244,225 | 1/1981 | Greenwood | 73/517 AV |
| 4,751,849 | 6/1988 | Paros et al. | 73/862.59 |
| 4,856,350 | 8/1989 | Hanson | 73/862.59 |
| 4,926,689 | 5/1990 | Hanson | 73/497 |
| 4,939,935 | 7/1990 | Amand | 73/517 AV |
| 5,005,413 | 4/1991 | Novack et al. | 73/517 AV |

*Primary Examiner*—John E. Chapman
*Attorney, Agent, or Firm*—Flehr, Hohbach, Test, Albritton & Herbert

[57] ABSTRACT

Accelerometer having a frame, a proofmass, one or more force sensitive transducers, and a strut interconnecting the transducers with the proofmass and the frame so that forces are applied to the transducers in accordance with movement of the proofmass along the sensitive axis. The transducers and the strut have similar thermal expansion properties and are arranged in such manner that they can expand together with changes in temperature independently of the frame and the proofmass without imposing any significant strain on the transducers. In certain disclosed embodiments, the transducers are formed as a unitary planar structure from a single piece of crystalline quartz material, and the strut is formed of the same material.

4 Claims, 3 Drawing Sheets

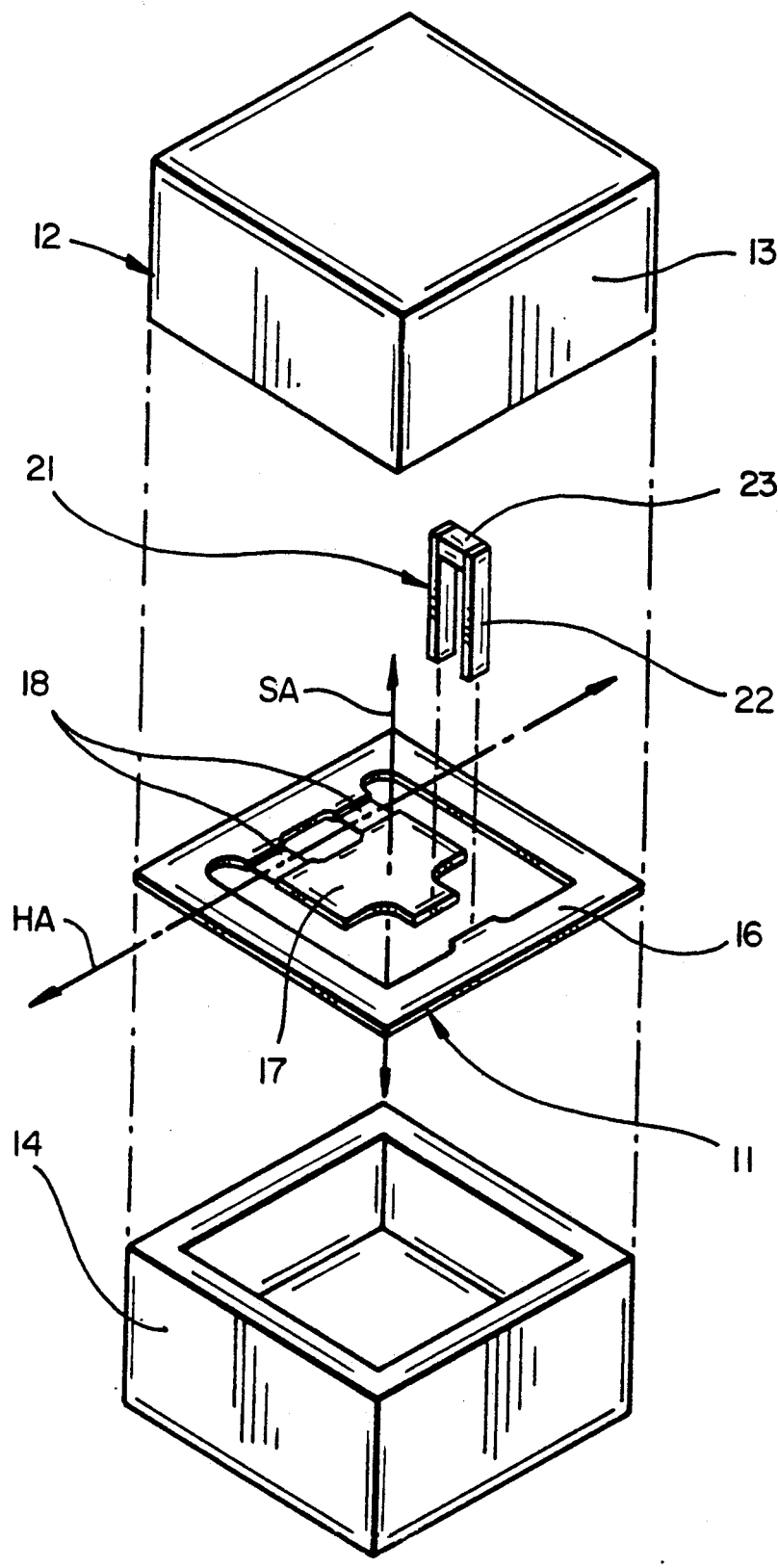
FIG_1

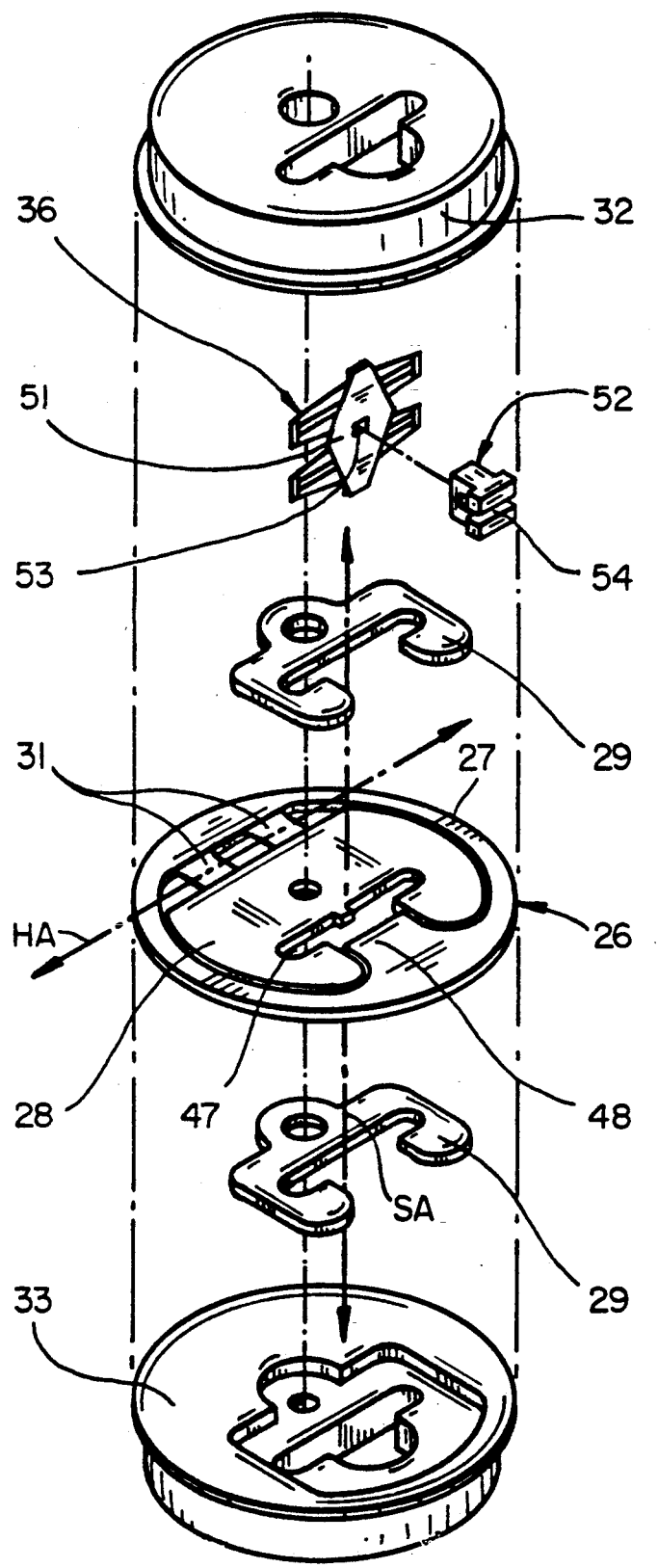
FIG_2

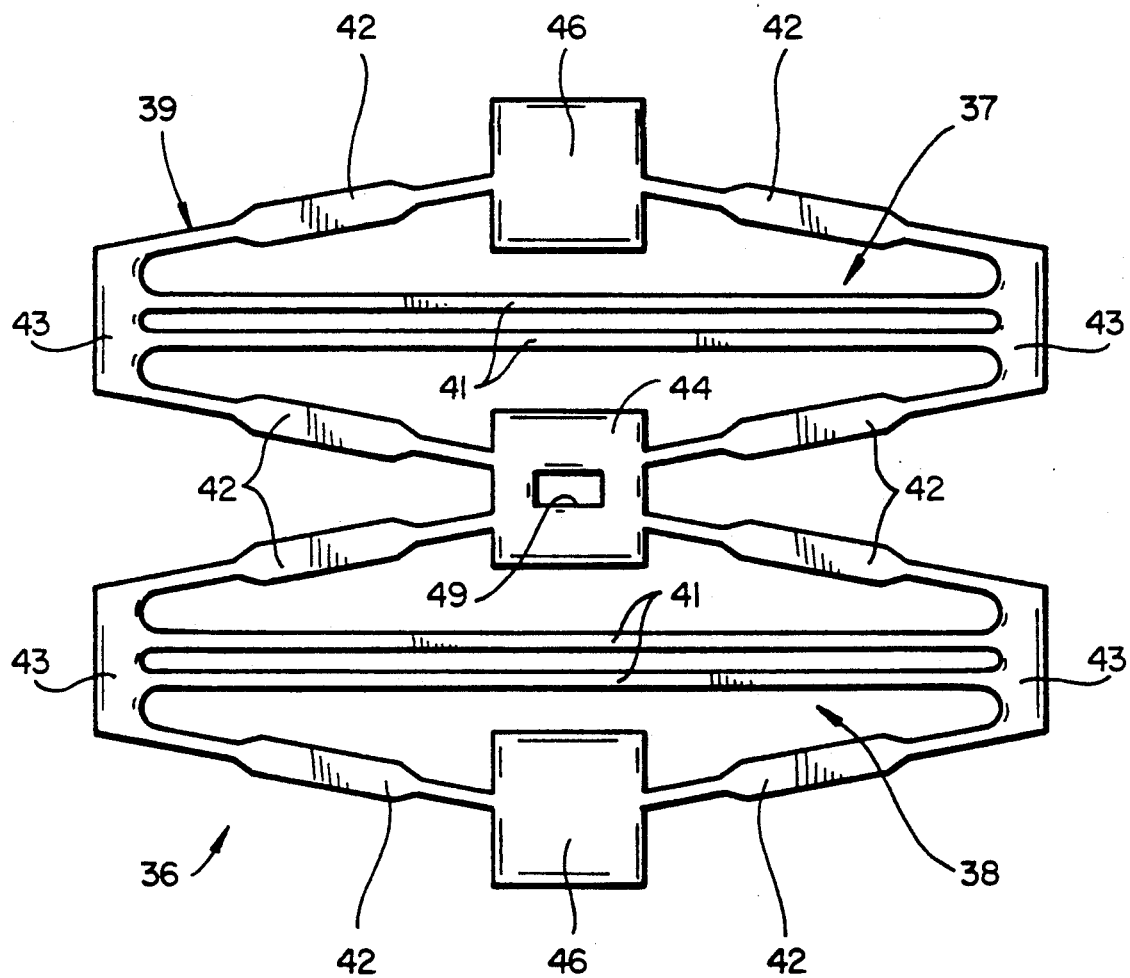
FIG_3

ACCELEROMETER WITH TEMPERATURE COMPENSATION AND MATCHED FORCE TRANSDUCERS

This invention pertains generally to inertial measuring devices and, more particularly, to an accelerometer in which operating errors due to mismatched thermal expansion rates between certain components thereof are eliminated.

Crystalline quartz force transducers, sometimes referred to as force crystals, are well known in the art, and several examples of such transducers are found in U.S. Pat. Nos. 4,856,350 and 4,970,903. The crystalline quartz material is employed in such transducers because of its piezoelectric properties and its ability to provide electrical signals corresponding to forces applied thereto.

Proofmass assemblies constructed primarily of fused quartz are also well known in the art, and examples of such assemblies are found in U.S. Pat. Nos. 4,926,689 and 4,955,233. Compared with crystalline quartz, the fused quartz material is more easily fabricated into the components of a proofmass suspension (e.g., a frame, flexures, pads, etc.) and is therefore more suitable for use in a proofmass assembly.

It is also well known in the art to combine crystalline quartz force transducers with proofmass assemblies constructed primarily of fused quartz to produce a transducer such as an accelerometer. However, there is a problem in doing so in that crystalline quartz has a thermal coefficient of expansion of about 8 ppm/° F., whereas fused quartz has a thermal coefficient of expansion of about 0.31 ppm/° F. Because of this substantial mismatch between the thermal coefficients of expansion of the two materials, when the accelerometer is subjected to changes in temperature, the force transducers will expand or contract to a greater extent than the proofmass and suspension assembly, applying forces to the transducers which may produce erroneous measurements of acceleration.

Heretofore, there have been attempts to compensate for the mismatched thermal expansion rates of crystalline quartz transducers and a fused quartz proofmass and suspension assembly in an accelerometer, and one such approach is found in U.S. Pat. No. 4,872,342 and in an article entitled "Superflex: A Synergistic Combination of Vibrating Beam and Quartz Flexure Accelerometer Technology" appearing in *Navigation: Journal of the Institute of Navigation*, Volume 34, No. 4, Winter 1987-88 88, pages 337-353. In this approach, the flexures which mount the proofmass are designed to permit translation of the proofmass in response to acceleration and rotation of the proofmass to take up differences in thermal expansion. For translation, the flexures must bend in an s-shaped curvature, and this requires that they be relatively long. This makes the natural frequency of proofmass relatively low so that local noise or surrounding vibration can cause the proofmass to resonate, resulting in an erroneous output signal or fracturing of the crystals or flexures. If the flexures are made shorter or stiffer in order to increase the natural frequency, there will be even larger errors resulting from the strains to which the flexures are subjected during assembly and operation.

Another prior approach to compensating for the thermal expansion problem is found in U.S. Pat. No. 4,718,275. According to this approach, a beam is pivotally connected to the proofmass for rotational movement about a compensation axis which is perpendicular to both the sensitive axis and the hinge axis, and a pair of force transducers are connected between the beam and the housing on opposite sides of the pivot. Acceleration along the sensitive axis results in a compressive force on one of the transducers and a tensive force on the other. When the accelerometer is subjected to temperature changes, differential thermal expansion or contraction between the transducers and the proofmass, beam, flexure hinge and housing will result in forces that tend to rotate the beam about the pivot, rather than tensioning or compressing the transducers. However, when an acceleration is applied along the sensitive axis, the proofmass and the beam undergo a combination of rotation and translation, subjecting the transducers to bending moments which can produce errors in the output readings.

Another accelerometer in which differences in thermal expansion are absorbed by rotation about an axis perpendicular to the hinge axis is found in U.S. Pat. Nos. 4,750,363 and 4,891,982. This accelerometer has a proofmass mounted to a housing by a pair of flexure hinges for pendulous movement along a sensitive axis. Force transducers are connected between the housing and a pair of arms which extend from opposite sides of the proofmass in a direction parallel to the pivot axis of the flexure hinges. In this device, differences in thermal expansion between the transducers and the rest of the assembly cause the proofmass to rotate about a compensating axis which is perpendicular to the sensitive axis and intersects the axis about which the flexure hinges bend at a point between the flexures.

This approach has the same disadvantage as described in the preceding paragraph in that acceleration applied along the sensitive axis results in a rotational movement of the proofmass as it pivots about the flexure hinges, which subjects the transducers to bending moments and results in erroneous output readings from some types of transducers.

In another approach utilizing a rotating platform to absorb differences in thermal expansion rates, the proofmass is suspended for rotation about a compensation axis parallel to the hinge axis in response to differences in expansion. While this approach avoids the application of undesired bending moments to the transducers, it still requires a degree of proofmass movement in addition to the translation by which acceleration is measured.

It is in general an object of the invention to provide a new and improved accelerometer in which operating errors due to mismatched thermal expansion rates are eliminated.

Another object of the invention is to provide an accelerometer of the above character which overcomes the limitations and disadvantages of accelerometers heretofore provided.

These and other objects are achieved in accordance with the invention by providing an accelerometer having a frame, a proofmass movable relative to the frame, one or more force sensitive transducers, and a strut interconnecting the transducers with the proofmass and the frame so that forces are applied to the transducers in accordance with movement of the proofmass along the sensitive axis. The transducers and the strut have similar thermal expansion properties and are arranged in such manner that they can expand together with changes in temperature independently of the frame and the proofmass without imposing any significant strain on the transducers. In certain disclosed embodiments, the transducers are formed as a unitary planar structure from a single piece of crystalline quartz material, and the strut is formed of the same material.

FIG. 1 is an exploded isometric view, somewhat schematic, of one embodiment of an accelerometer according to the invention.

FIG. 2 is an exploded isometric view of another embodiment of an accelerometer according to the invention.

FIG. 3 is an enlarged plan view of the transducer assembly in the embodiment of FIG. 2.

As illustrated in FIG. 1, the accelerometer includes a proofmass assembly 11 which is mounted in a housing 12 formed in two sections 13, 14.

The proofmass assembly includes a generally rectangular circumferential support frame 16, a proofmass 17, and a pair of flexures 18 which mount the proofmass to the frame for pendulous movement about a hinge axis HA which extends in a direction perpendicular to the sensitive axis SA of the device. In one presently preferred embodiment, the proofmass assembly is fabricated as a unitary structure from a single wafer of fused quartz. The frame of the proofmass assembly is received between the confronting surfaces of the two housing sections, with the proofmass being free for pendulous movement along the sensitive axis within the housing. The housing sections are attached to the frame.

Movement of the proofmass along the sensitive axis is monitored by a transducer 21 which is connected between the proofmass and the frame of the proofmass assembly such that forces are applied to the transducer in accordance with movement of the proofmass along the sensitive axis. The transducer is fabricated of a suitable material such as crystalline quartz and can be of any suitable type. One such transducer might, for example, have a pair of vibrating tines which are driven 180° out of phase by an oscillator (not shown), with the tension in the tines and hence the frequency of vibration varying with the movement of the proofmass and the forces applied to the transducer.

To prevent differences in thermal expansion between the proofmass assembly and the transducer from stressing the transducer and producing erroneous output readings, the transducer is interconnected with the proofmass and the frame by means of a strut 22 which has thermal expansion properties similar to those of the transducer. This is done in one presently preferred embodiment by fabricating the strut of the same material as the transducer, i.e. crystalline quartz.

In FIG. 1, the transducer and the strut are shown somewhat schematically as elongated elements extending parallel to each other and to the sensitive axis. The lower ends of the transducer and the strut are connected to the proofmass and frame, respectively, and the upper ends are connected together by suitable means 23 which can, for example, simply be an adhesive. With the accelerometer oriented as shown in this figure, deflection of the proofmass in a downward direction causes a tensive force to be applied to the transducer, and deflection in an upward direction results in a compressive force.

With the transducer and strut having similar thermal expansion properties and being of equal length, they are free to expand together with changes in temperature, independently of the frame and the proofmass and without imposing any significant strain on the transducer.

In the embodiment of FIG. 2, the proofmass assembly 26 includes a generally circular circumferential support frame 27, a proofmass comprising a pendulum 28 and a pair of masses 29 attached to the pendulum, and a pair of flexures 31 which mount the pendulum to the frame for movement about a hinge axis HA which extends in a direction perpendicular to the sensitive axis SA. As in the embodiment of FIG. 1, the frame, pendulum and flexures are fabricated as a unitary structure from a single wafer of fused quartz. The masses also are fabricated of fused quartz, or a material having compatible thermal expansion properties, and are affixed to the surfaces of the pendulum. The frame is received between the confronting surfaces of housing sections 32, 33, and the frame and the housing sections are affixed together.

Movement of the proofmass along the sensitive axis is monitored by a transducer assembly 36. This assembly includes a pair of transducers 37, 38, each of which has a quadrilateral frame 39 with a pair of vibrating tines 41 extending between opposing corners thereof. Each frame consists of four links 42, with end pieces 43 at the corners to which the tines are connected and force receiving pads 44, 46 at the intermediate corners. The transducers are positioned back-to-back, with the tines in the two transducers parallel to each other and pad 44 at the junction of and common to the two transducers. The transducer assembly is fabricated as a unitary structure from a single wafer of crystalline quartz material. Transducers of this general type are described in greater detail in U.S. Pat. Nos. 4,856,350 and 4,970,903, but not the back-to-back arrangement or the fabrication of two such transducers from the same piece of material.

Transducer assembly 36 extends through a slotted opening 47 in pendulum 28, with the plane of the transducer assembly parallel to sensitive axis SA. The pendulum is connected to the common pad 44 of the transducers by a lug 48 which is received in a slot 49 in the pad, and the outer pads 46 of the transducers are connected to frame 27 by a strut 51. The outer portions of the strut are affixed to the outer pads, and the central portion of the strut is affixed to the frame by a connector 52. The connector has a lug (not shown) which is received in a slot 53 in the strut, and a slot 54 in which the portion of the frame adjacent to opening 47 is received. The connector is secured to the strut and to the frame by suitable means such as an adhesive.

Deflection of the proofmass in either direction along the sensitive axis applies a compressive force between the pads of one transducer and a tensive force between the pads of the other. The quadrilateral frames apply an increased tensive force to the tines of the transducer which is compressed and decrease the tension of the tines in the other, thereby increasing the vibrational frequency of one transducer and decreasing the frequency of the other.

Strut 51 is fabricated of the same material as transducer assembly 36 (crystalline quartz) or a material having similar thermal expansion properties. As in the embodiment of FIG. 1, the strut and the transducer assembly are free to expand together with changes in temperature, independently of the frame and the proofmass assembly and without imposing any significant strain on the transducers.

When the difference between the frequencies of the two transducers is utilized in determining acceleration, the scale factor is effectively doubled, and errors due to causes which make both frequencies change in the same direction (e.g., changes in temperature) are eliminated. This common mode rejection is enhanced significantly by the close matching of the transducers which is obtained by fabricating them from the same wafer.

In an alternate embodiment which is similar to that of FIG. 2, the proofmass assembly frame 27 is connected to the outer pads 46 of the transducers by a strut which extends in a direction perpendicular to the transducer assembly rather than being parallel to it. The strut has a central slot which fits over the frame, with the outer portions of the strut being affixed to the outer pads of the transducers. The connection between the strut and the frame is strengthened by a fillet with crossed slots in which the adjacent portions of the strut and the frame are received. The fillet is affixed to the strut and frame with an adhesive.

As in the other embodiments, the strut is fabricated of the same material as the transducers (crystalline quartz) or a material having similar thermal expansion properties. Here again, the strut and the transducer assembly are free to expand together with changes in temperature, independently of the frame and the proofmass assembly and without imposing any significant strain on the transducers.

Operation and use of the alternate embodiment are similar to that of the embodiment of FIG. 2, with an additional advantage in that with the strut being perpendicular to the transducer assembly, the effect of bending moments on the strut are reduced since the strut is stiffer in the perpendicular direction.

It is apparent from the foregoing that a new and improved accelerometer has been provided. While only certain presently preferred embodiments have been described in detail, as will be apparent to those familiar with the art, certain changes and modifications can be made without departing from the scope of the invention as defined by the following claims.

We claim:

1. In an accelerometer for measuring acceleration along a sensitive axis:
   (a) a support frame;
   (b) a proofmass movable relative to the support frame with a component of motion along the sensitive axis;
   (c) a pair of force sensing transducers fabricated as a generally planar unit from a single piece of crystalline quartz material with elongated tines adapted to vibrate at a frequency corresponding to tensive/compressive forces applied thereto, the transducers having quadrilateral frames with the tines extending between opposing corners thereof and force receiving pads at the intermediate corners, the two quadrilateral frames being joined together back-to-back with the tines in the two transducers parallel to each other and the proofmass connected to one of the pads at the junction of the two quadrilateral frames; and
   (d) means comprising a strut connected to the support frame and to the remaining pads for applying tensive/compressive forces to the tines in accordance with movement of the proofmass along the sensitive axis.

2. The accelerometer of claim 1 wherein the strut comprises a planar member extending in a direction parallel to the plane of the transducers.

3. In an accelerometer for measuring acceleration along a sensitive axis:
   (a) a support frame;
   (b) a pendulum hingedly connected to the support frame for pendulous movement with a component of motion along the sensitive axis;
   (c) a generally planar transducer assembly fabricated as a unitary structure from a single piece of crystalline quartz material and having a pair of quadrilateral frames joined together at one corner thereof, vibrating tines extending between opposing corners of the quadrilateral frames, with the tines in the two frames being parallel to each other, a common force receiving pad at the junction of the two frames, and an outer pair of force receiving pads at the corners of the frames opposite the junction;
   (d) means connecting the pendulum to the common pad of the transducer assembly; and
   (e) a strut connected to the support frame and to the outer pads of the transducer assembly for applying forces to the transducer assembly to tension the tines and thereby vary the vibrational frequency thereof in accordance with movement of the pendulum along the sensitive axis.

4. The accelerometer of claim 3 wherein the strut comprises a planar member extending in a direction parallel to the plane of the transducer assembly.

* * * * *